(12) United States Patent
Schmitz et al.

(10) Patent No.: US 11,185,942 B2
(45) Date of Patent: Nov. 30, 2021

(54) MULTI-PROCESS TORCH

(71) Applicant: ILLINOIS TOOL WORKS INC., Glenview, IL (US)

(72) Inventors: Adam Richard Schmitz, Appleton, WI (US); Chris J. Roehl, Appleton, WI (US); Scott Ryan Rozmarynowski, Greenville, WI (US); Zachary William MacMullen, Larsen, WI (US); Lauren Goulet, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 552 days.

(21) Appl. No.: 15/339,391

(22) Filed: Oct. 31, 2016

(65) Prior Publication Data

US 2018/0117703 A1    May 3, 2018

(51) Int. Cl.
   *B23K 9/32*   (2006.01)
   *H04B 3/54*   (2006.01)
   *B23K 9/28*   (2006.01)
   *B23K 9/167*  (2006.01)
   *B23K 9/10*   (2006.01)
   (Continued)

(52) U.S. Cl.
   CPC ............ *B23K 9/323* (2013.01); *B23K 9/1087* (2013.01); *B23K 9/167* (2013.01); *B23K 9/173* (2013.01); *B23K 9/282* (2013.01); *B23K 9/287* (2013.01); *B23K 9/291* (2013.01); *B23K 9/293* (2013.01); *B23K 9/295* (2013.01); *B23K 9/296* (2013.01);
   (Continued)

(58) Field of Classification Search
   CPC ...... B23K 9/1087; B23K 9/167; B23K 9/173; B23K 9/282; B23K 9/287; B23K 9/291; B23K 9/293; B23K 9/295; B23K 9/296; B23K 9/32; B23K 9/323; H04B 2203/5454; H04B 3/54
   USPC ........................................ 219/137.31–137.63
   See application file for complete search history.

(56) References Cited

U.S. PATENT DOCUMENTS

| | | | |
|---|---|---|---|
| 4,645,901 A | * | 2/1987 | Scholz .................. B23K 9/323 219/125.1 |
| 4,864,099 A | | 9/1989 | Cusick |
| (Continued) | | | |

FOREIGN PATENT DOCUMENTS

| | | |
|---|---|---|
| CN | 2796919 Y | 7/2006 |
| CN | 202894551 U | 4/2013 |
| (Continued) | | |

OTHER PUBLICATIONS

CyberWeld website page, Thermal Dynamics Plasma 1 Torch Leads Extension 7-7544, Jul. 18, 2016, 3 pages.

(Continued)

*Primary Examiner* — Sang Y Paik
(74) *Attorney, Agent, or Firm* — McAndrews, Held & Malloy, Ltd.

(57) ABSTRACT

Aspects of a welding-type cable and torch are provided. The welding-type cable includes a power conductor to conduct welding-type power and a weld torch interface on a distal end of the welding-type cable to attach a weld torch to the power conductor. The welding-type torch includes a power connector to transfer welding-type power between the welding-type torch and a power conductor of a welding-type cable that is detachably coupled to the power connector. An electrode to perform a welding-type operation using the welding-type power is also provided.

19 Claims, 12 Drawing Sheets

(51) Int. Cl.
*B23K 9/29* (2006.01)
*B23K 9/173* (2006.01)

(52) U.S. Cl.
CPC ............... *B23K 9/32* (2013.01); *H04B 3/54* (2013.01); *H04B 2203/5454* (2013.01)

(56) References Cited

U.S. PATENT DOCUMENTS

| | | | | |
|---|---|---|---|---|
| 5,258,599 A | * | 11/1993 | Moerke | ............... B23K 9/295 219/121.45 |
| 5,338,917 A | * | 8/1994 | Stuart | ............... B23K 9/287 219/137.51 |
| 7,755,000 B2 | * | 7/2010 | Stanzel | ............... B23K 9/323 219/137.2 |
| 9,040,872 B2 | | 5/2015 | Anzengruber et al. | |
| 2005/0121495 A1 | * | 6/2005 | Yokoyama | ........... B23K 3/0478 228/9 |
| 2009/0212034 A1 | | 8/2009 | Willenkamp | |
| 2016/0059423 A1 | * | 3/2016 | Pedersen | ............... B25J 15/04 74/490.05 |
| 2016/0236304 A1 | * | 8/2016 | Grossauer | ............. B23K 9/173 |

FOREIGN PATENT DOCUMENTS

| | | |
|---|---|---|
| CN | 104736286 A | 6/2015 |
| DE | 19813419 C2 | 12/2000 |
| GB | 1354395 A | 6/1974 |
| WO | 00/44523 | 8/2000 |
| WO | 0044523 A1 | 8/2000 |
| WO | 2009108241 | 9/2009 |

OTHER PUBLICATIONS

Thermal Dynamics Master Guide, Instructions for: Torches, Adapter kits, Lead Extensions, Remote Interface, Replacement Parts. Apr. 15, 2004, 187 pages.

* cited by examiner

MULTI-PROCESS TORCH

The disclosure relates generally to systems and apparatuses employing multiple welding-type torches across multiple weld processes, and more particularly to a power supply and multi-use cable assembly for use with multiple welding-type torch heads.

BACKGROUND

Welding has been developed and refined for years as one of the most widely used material joining technologies. Welding torches today typically have a cable permanently attached. With welding machines commonly utilized at construction and other worksites, the machines, and especially the cables, are subjected to abuse in the form of high tension, abrasion, and shear as the power sources, wire feeders or remotes, and cables are manipulated by an operator around other obstacles common at a worksite.

The components of welding machines are often crushed, snagged, cut, warn, or otherwise damaged, even under normal working conditions. In a system where a torch head is fixed to a cable, replacement of the cable would require replacement of the torch head as well, regardless of the condition of the torch head. Conversely, if a torch head must be replaced, a replacement cable would come attached to the replacement torch. The result is an expensive, time consuming process that may include unnecessarily replacing serviceable components simply because they are permanently attached to a damaged cable, torch, etc.

Therefore, a system with a modular design for easy replacement and repair of weld cables and welding-type torches is desirable.

BRIEF DESCRIPTION OF THE DRAWINGS

The drawings are not to scale. Where appropriate, the identical reference numerals are used to describe the identical and/or similar components.

DETAILED DESCRIPTION

Embodiments of the present disclosure will be described with respect to a welding system that includes a welding-type torch connectable to a multi-use weld cable assembly.

Disclosed examples relate to the use of different welding-type torches across multiple weld processes with a modular, multi-use, multi-process cable. Systems and apparatus described herein allow a user to quickly and efficiently swap between different welding-type torches employing the same weld cable. In other words, a user need purchase only a single weld cable assembly while maintaining the flexibility to replace a welding-type torch as needed. Conversely, a user may replace a damaged cable without having to also replace an operational weld torch. Thus, the examples described herein advantageously reduce the number of weld cables needed to operate multiple weld-type torches, as well as ensuring repairs and/or replacement of components is limited to only inoperative items.

Disclosed example multi-process torches include a connector having an interface configured with ports and/or receptacles for the receipt and/or transmission of data, power, signals, electrode wire, welding gas, etc. The connector of the multi-process torch is paired with a connector of a cable configured to convey the data, power, signals, wire, and/or gas. For example, the cable provides multiple channels, each configured to transmit a different item.

Figure 1:
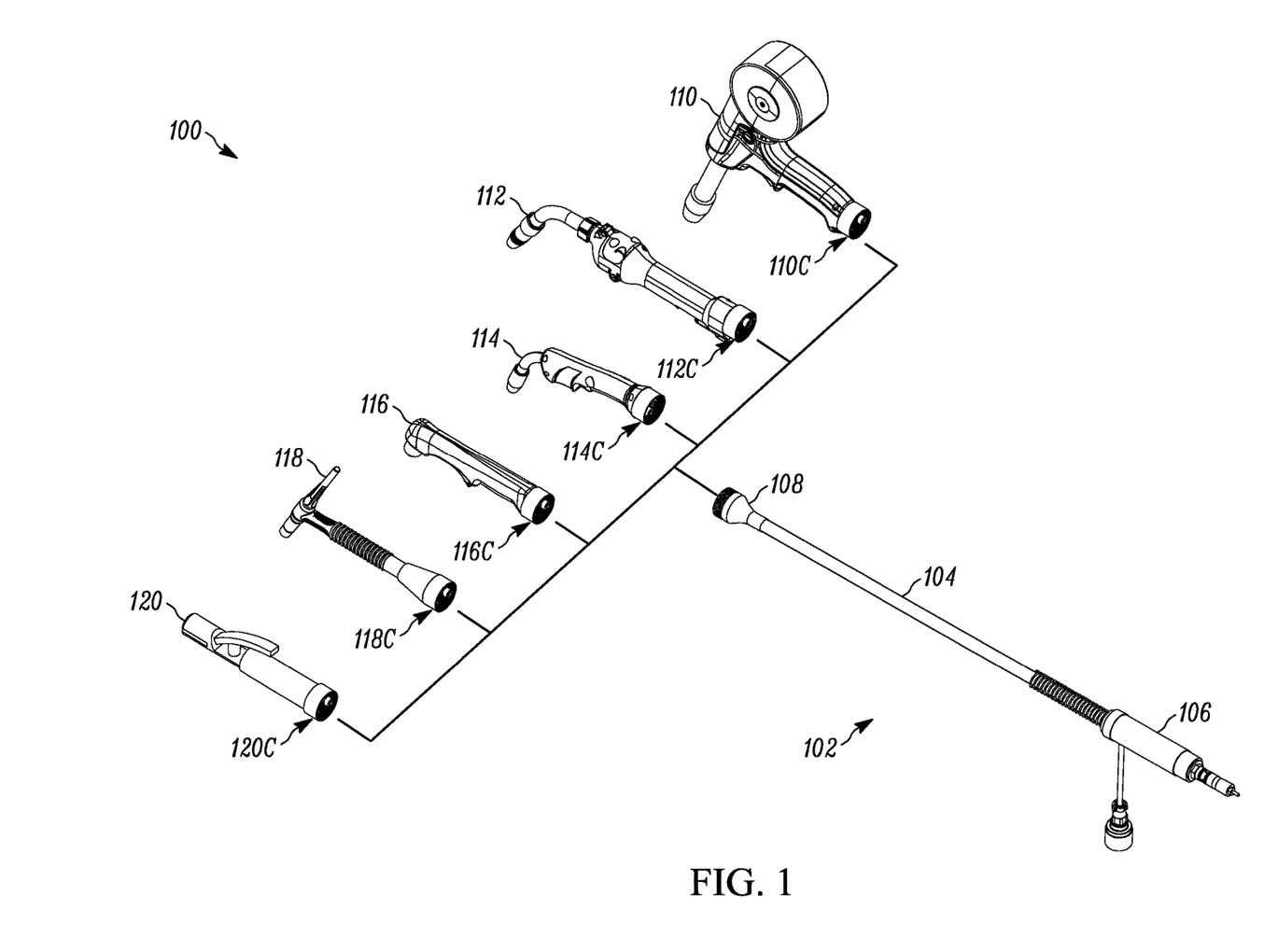
FIG. 1 depicts an example multi-process torch system including a plurality of welding-type torches and a multi-use cable assembly.

FIG. 1 provides a system 100 including a multi-use cable assembly 102 configured to connect to different welding-type torches 110, 112, 114, 116, 118, 120, corresponding to a spool gun 110, a push-pull gun 112, a metal inert gas ("MIG") torch 114, a plasma torch 116, a tungsten inert gas ("TIG") torch 118, and a stick electrode holder 120, respectively. The welding-type torches 110-120 may be implemented as manual weld torches and/or as robotically manipulated weld torches. As described in greater detail below, a user is able to attach each of the welding-type torches 110, 112, 114, 116, 118, 120 to the multi-use cable assembly 102. In other words, the welding-type torches 110-120 are detachable instead of permanently affixed to the cable assembly 102, making replacement and repair simpler, more efficient, and/or more cost effective.

In the example illustrated in FIG. 1, the multi-use cable assembly 102 includes a cable connector 108 at a distal end, a machine power pin 106 at a proximal end, and a multi-channel cable 104 connecting the two. The machine power pin 106 connects with a power supply and/or a control system (not shown) to facilitate operation of a connected welding-type torch. The cable connector 108 is configured with plural ports and/or receptacles. The connector 108 is further configured with a lock to detachably secure the multi-use cable assembly 102 to a corresponding connector 110C, 112C, 114C, 116C, 118C, 120C, of each respective welding-type torch 110, 112, 114, 116, 118, 120. Although FIG. 1 shows connectors 110C, 112C, 114C, 116C, 118C, 120C as fixed to the body of the respective welding-type torch 110, 112, 114, 116, 118, 120, each connector can be configured as a cable extension attached to the welding-type torch. For example, a short "whip" style length of cable can be directly attached to the back of the torch handle in close proximity to the torch with the connector at a distal end for connection to the multi-channel cable 104. The whip length of cable may reduce strain on the connectors 108, 110C, 112C, 114C, 116C, 118C, 120C and/or improve flexibility of the assembly.

Once connected, each port and/or receptacle corresponding to a channel of the cable 104 that conveys an item needed for operation of a specific welding-type torch is aligned at the coupling of cable connector 108 with connector 110C, 112C, 114C, 116C, 118C, 120C. Therefore, each welding-type torch 110, 112, 114, 116, 118, 120 is provided with each item needed for operation, regardless of which specific welding-type torch is connected to the multi-use cable assembly 102.

Figure 2A:
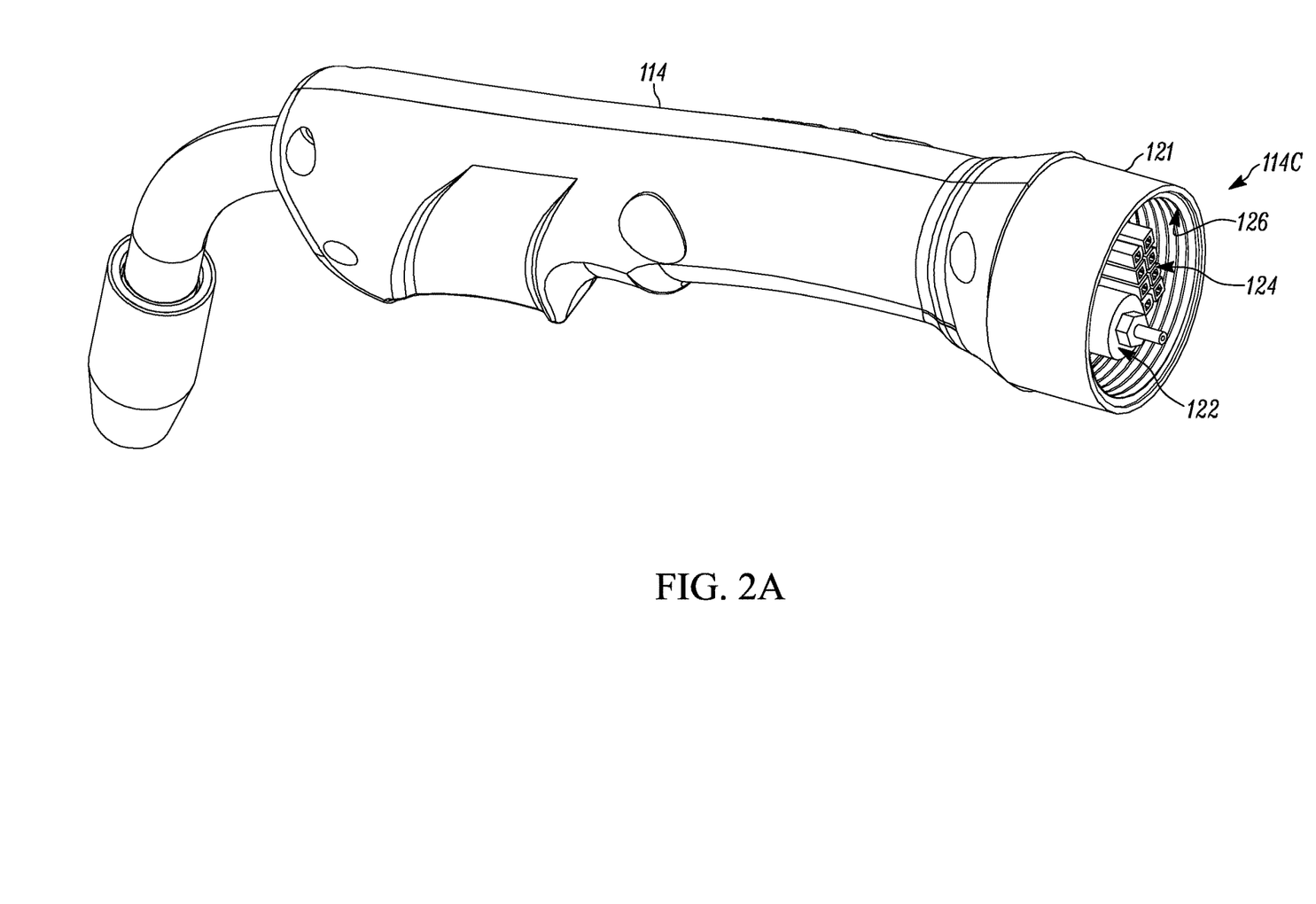
FIG. 2A depicts a perspective view of an example individual torch interface.
Figure 2B:
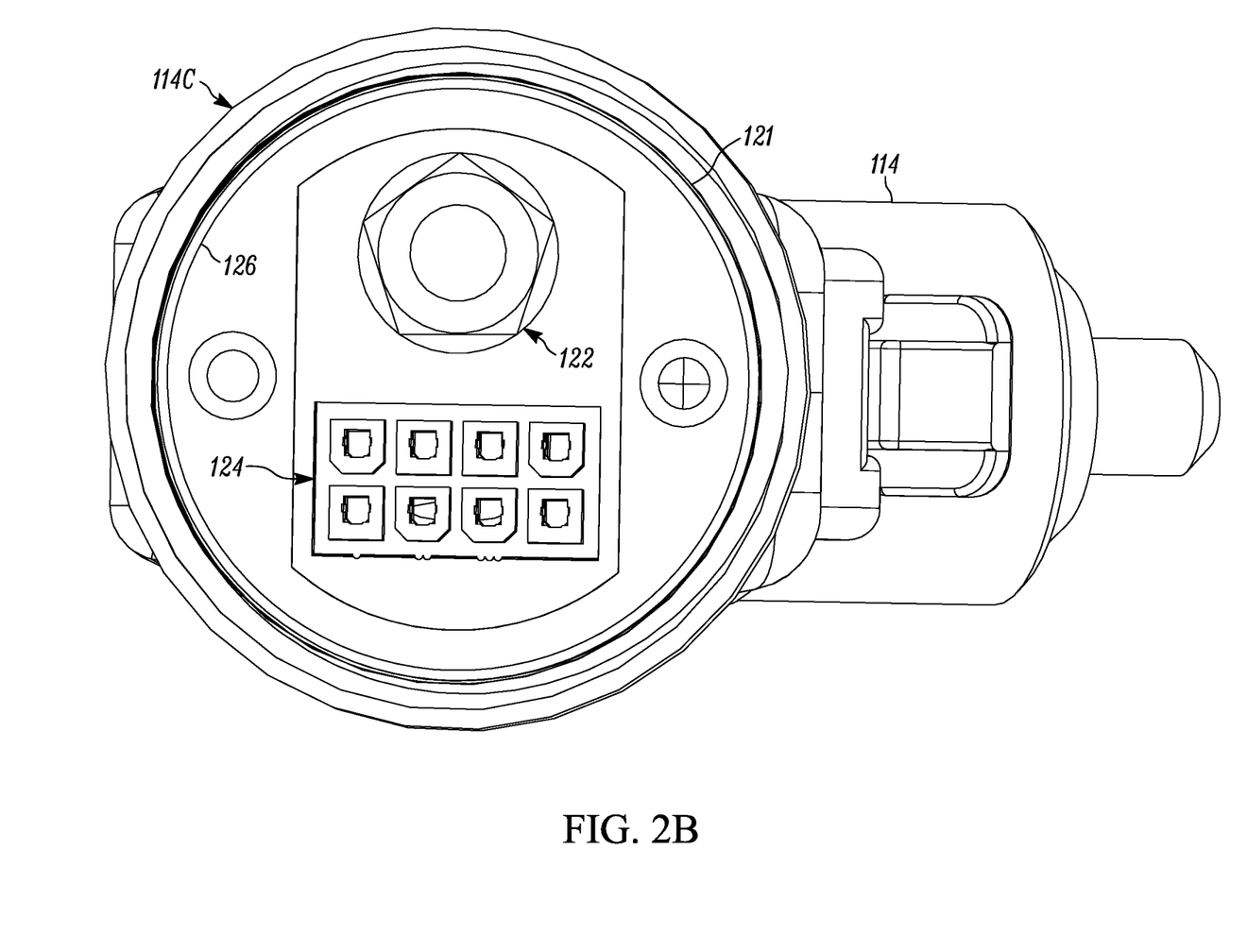
FIG. 2B depicts a detailed view of a connector of the individual torch interface of FIG. 2A.

In the example shown in FIG. 2, welding-type torch 114 includes connector 114C. Within the connector 114C is a power port 122 to provide at least one of welding-type power, gas, and wire to the welding-type torch 114. Although a single port is shown in the example of FIG. 2, more than one port can be used, such as a dedicated port for each item provided to the welding-type torch 114. Additionally or alternatively, one or more pins 124 are provided to transmit and/or receive data and/or control signals between the welding-type torch and a computer, controller, power supply, display or other information source. FIG. 2A depicts a detailed view of the connector 114C. In the example of FIG. 2A, the individual pins 124 can be seen as a series of pin connectors, having eight pins in total. However, fewer or more pins can be employed, depending on the particular torch and/or application. Further, the power port 122 is shown extending from a base of the connector 114C, such that a female receptacle (e.g. female receptacle 128, shown in FIG. 3) can transmit power, gas, and wire to the welding-type torch 114.

Figure 3:
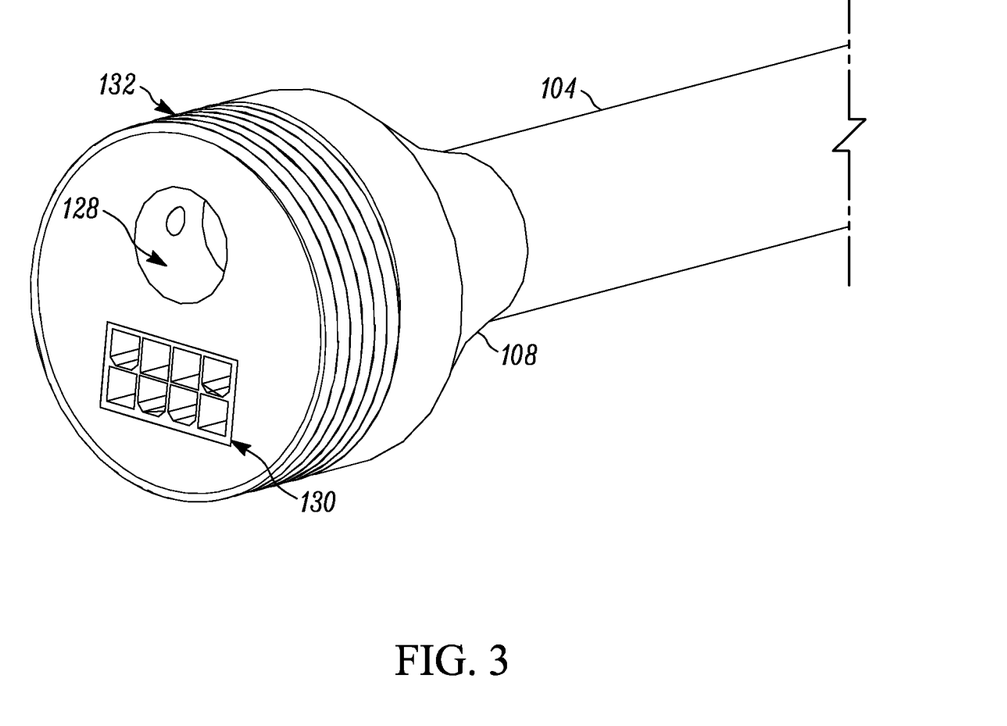
FIG. 3 depicts a perspective view of an example cable interface.

FIG. 3 illustrates cable connector 108 on the distal end of multi-channel cable 104. At the end surface of cable connector 108 is a female receptacle 128 corresponding to power port 122, and a multi-pin connector 130 corresponding to pins 124. Although a single receptacle is shown, different welding-type torches may use one or more receptacles. For example, one or more receptacles can provide a gas input so as to receive gas from a gas supply, such as a canister of shielding gas (not shown). The welding-type torch connector would similarly include a gas connector for provision of gas to the welding-type torch. Further, although multi-pin connector 130 is shown having eight pins, fewer or more pins may be used depending on the particular application. The pins would transmit and receive data, including commands, status updates, and controls to a power supply, for example. A pair of pins could, for instance, correspond to a resistor with a resistance value unique to each different type of welding-type torch. Data of a particular resistance can be identified by a power source via an interrogation procedure to identify which of the various welding-type torches is attached to the multi-channel cable 104. The interrogation procedure may include, for example, applying a known voltage (or current) to the pins corresponding to the resistor, measuring the resulting current (or voltage), and using Ohm's law to calculate the resistance across the pins.

Referring back to FIG. 2, connector 114C further provides a lock 121 to ensure a stable connection between connector 114C and cable connector 108 (see, e.g., FIG. 3). In the example of FIG. 2, connector 114C is a female type connector having threads 126 to screw onto a male type connector, such as threading 132 of cable connector 108. Thus, once properly aligned and locked, a secure connection is provided between the welding-type torch 114 and the multi-use cable assembly 102.

While an example implementation of the lock 121 is illustrated in FIGS. 2 and 3, other implementations may be used. For example, the lock 121 may be implemented using another thread specification, a quick disconnect connector, one or more latches, clips, or the like, configured to hold the connector 108 to the opposing connector (e.g., the connector 114C) when the connectors are seated, and/or any other method of securing connectors.

Figure 4A:
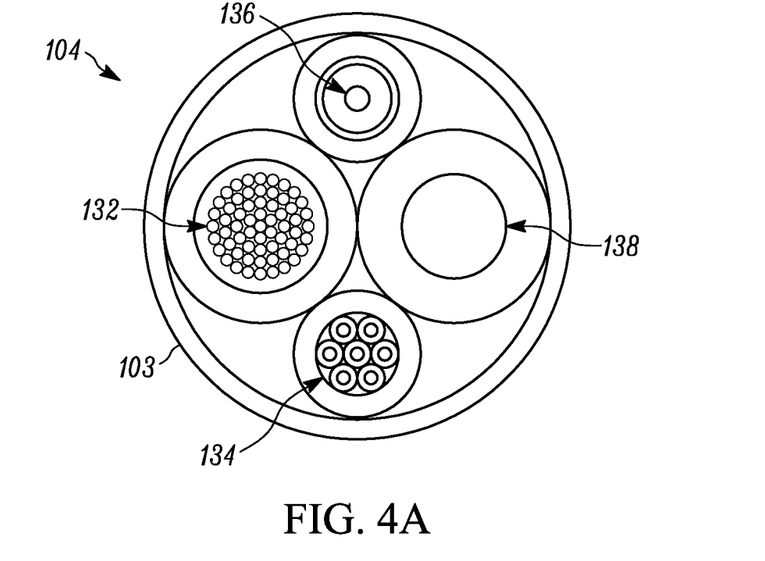
FIG. 4A depicts a cross-sectional view of an example multi-use multi-channel cable.
Figure 4B:
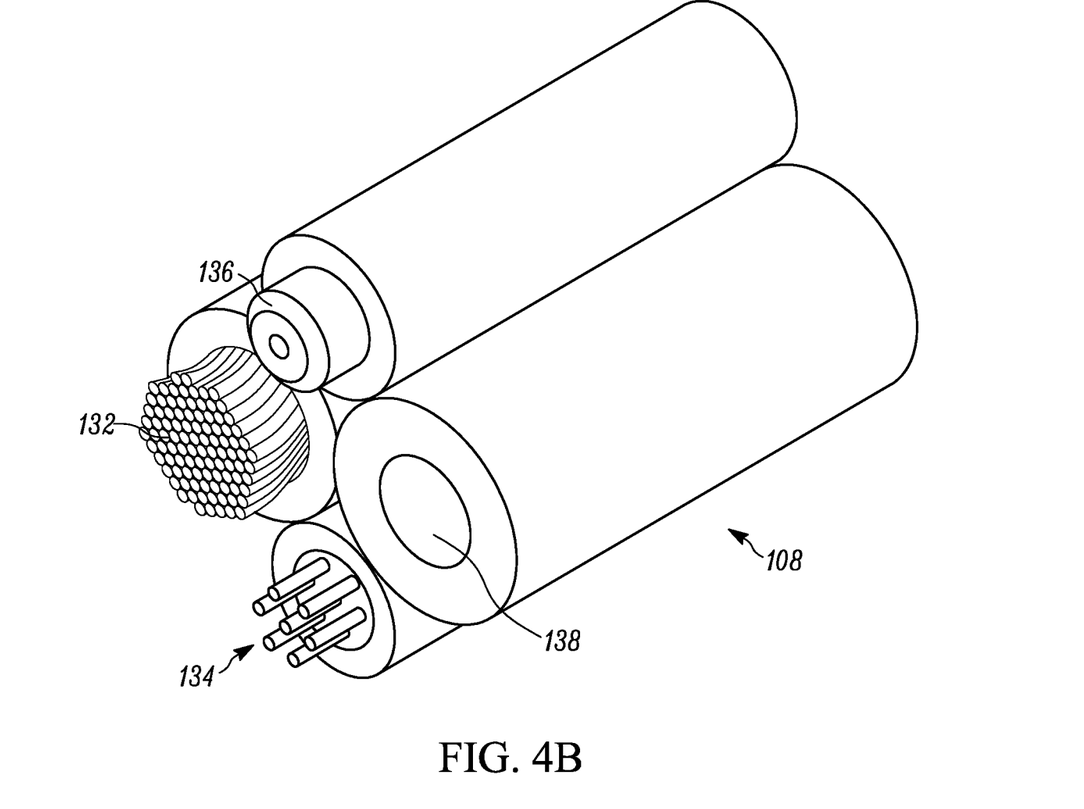
FIG. 4B depicts a perspective view of the multi-use multi-channel cable.

FIGS. 4A and 4B illustrate cross-sectional and perspective views, respectively, of an example integrated multi-channel cable, such as multi-channel cable 104. FIG. 4A shows multi-channel cable 104 including four separate channels, each to provide a different item, encased in a sheathing 103. In the example of FIG. 4A, channel 132 includes conductors to carry welding-type power. Channel 134 provides one or more data/information cables. Gas and/or air are carried through channel 136, and an electrode wire, such as for a MIG welder, can be guided through weld liner channel 138. Each channel can terminate at one or more ports of cable connector 108 corresponding to a port and/or receptacle of connector 114C.

FIG. 4B shows a perspective view of FIG. 4A without the sheathing 103. In some examples, the cable connector 108 may provide items not required for operation of each available weld-type torch. In this example, multi-channel cable 104 includes four channels, including weld liner 138. Accordingly, cable connector 108 would provide a port for each item, including a wire port to provide an electrode wire through weld liner 138. In this example, the port associated with weld liner 138, useful for a MIG welding-type torch 114, would have a corresponding port in connector 114C to accept the electrode wire. However, such weld liner would not be needed, for instance, in a TIG welding-type torch 118. Thus, connector 118C need not provide a corresponding port for the weld liner 138.

Figure 5:
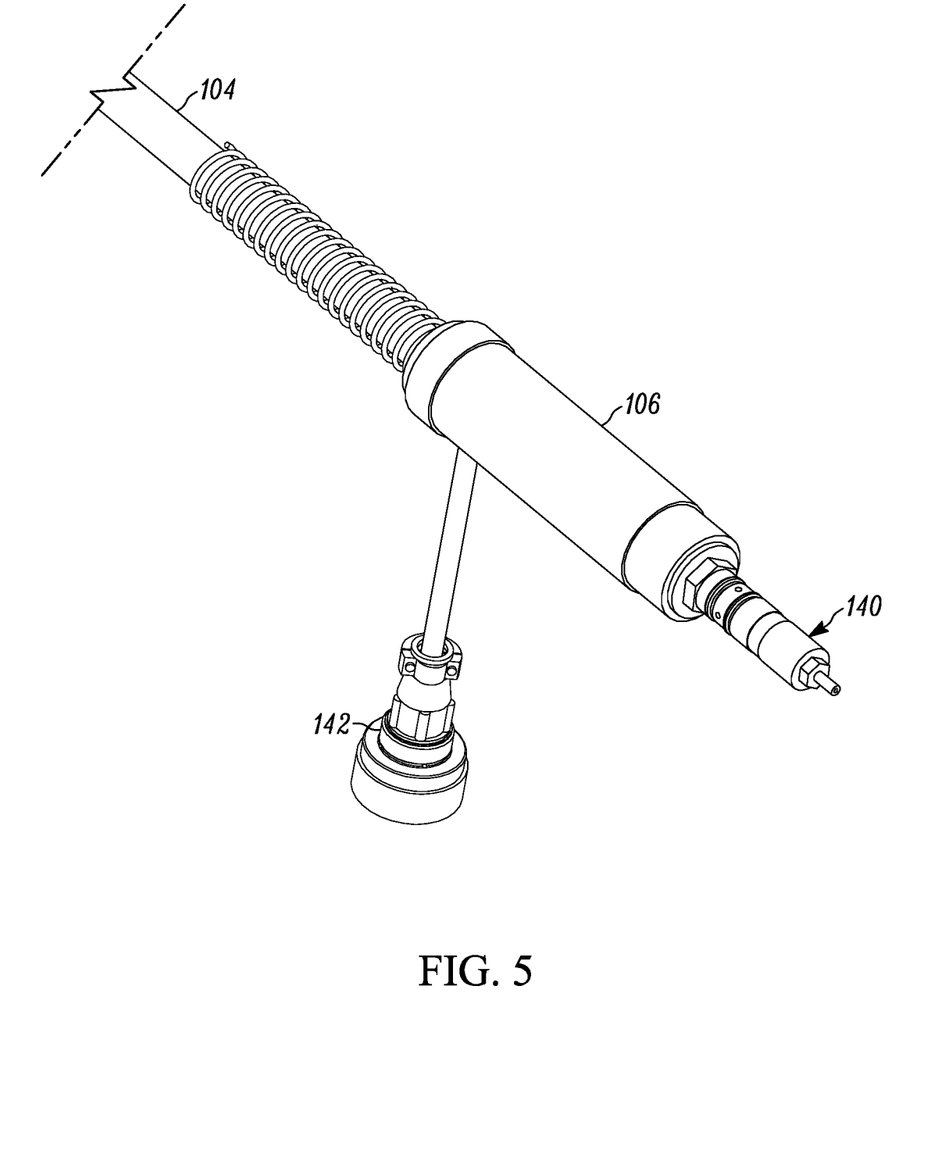
FIG. 5 depicts a perspective view of an example power pin connection.

FIG. 5 illustrates a detailed perspective view of power pin 106, as shown in FIG. 1. Connector port 140 is linked with a power supply (not shown). Thus, the power conductor 132 transfers welding-type power through connector port 140 between the power supply and the welding-type torch. Further, the power supply interface is configured to be connectable to standard power supply weld studs, although other configurations fall within the scope of the present disclosure. A welding power supply includes one or more transformers to convert electricity from a utility line or a generator and output the electricity to a usable form by the welding system. In examples, the power source runs on one of a number of modes including a constant voltage ("CV") and constant current ("CC"). In some examples, the power supply may be a 3-phase power supply, such as a Dimension™ 452 manufactured by Miller Electric Mfg. Co. of Appleton, Wis. In other embodiments, the power supply may be an inverter welding power supply, such as an XMT® 350 manufactured by Miller Electric Mfg. Co. of Appleton, Wis. In yet further examples, the power supply may be an engine-driven welding power supply, such as a Big Blue® 300 Pro manufactured by Miller Electric Mfg. Co. of Appleton, Wis. Any desired power supply may be utilized, including additional and alternative power supplies not listed.

While the connectors 106, 108, 114C of FIGS. 1, 2, 3, and 5 illustrate example male/female arrangements of the pins and/or connectors, any other arrangement of male/female connectors may be used.

Connector link 142 of FIG. 5 connects with a controller, computer or other source of information and instruction (not shown), such as through data cables 134. Thus, connector link 142 can provide a multi-pin interface to a controller.

Figure 6:
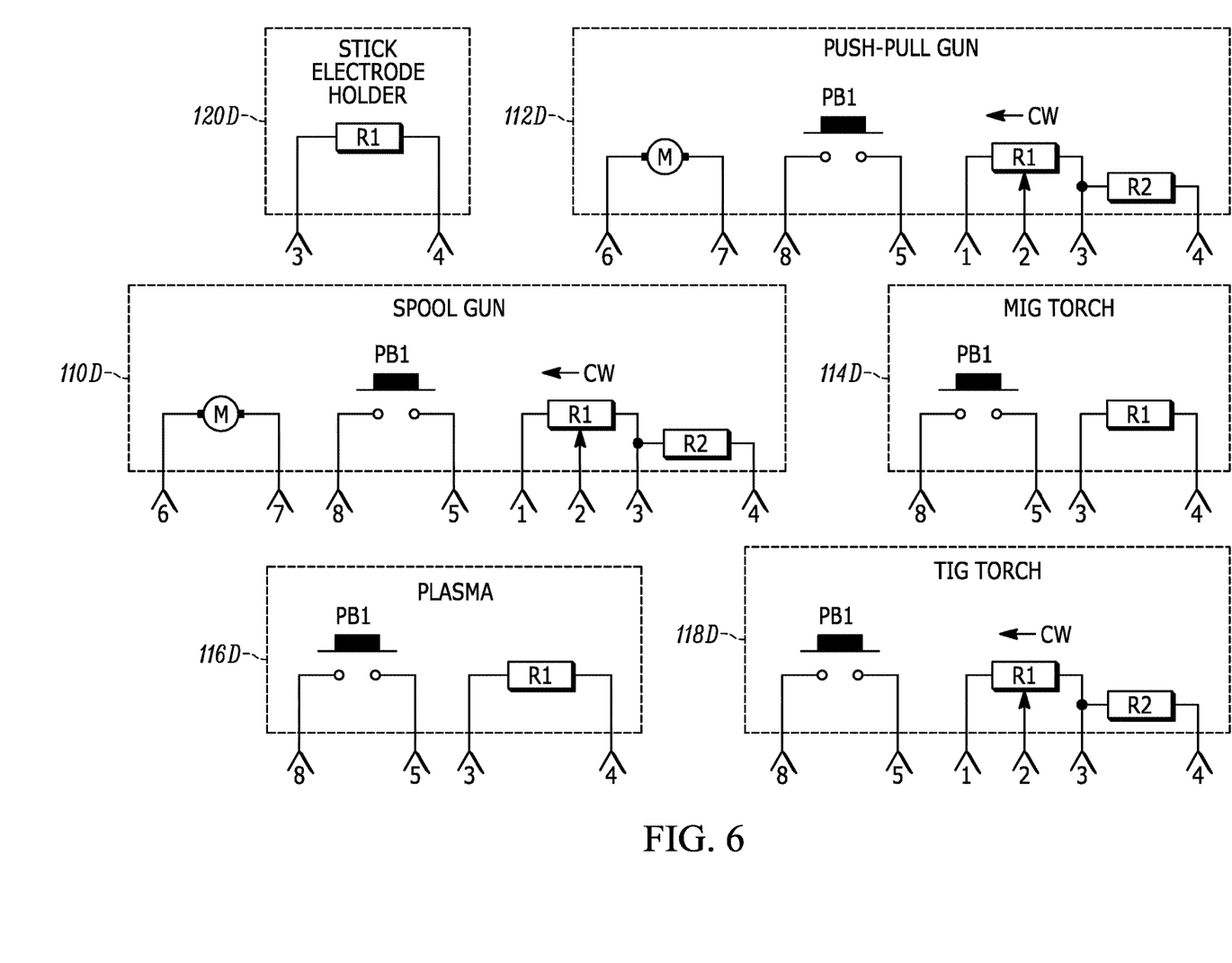
FIG. 6 depicts an example electrical diagram for operating the example system of FIG. 1.
Figure 7:
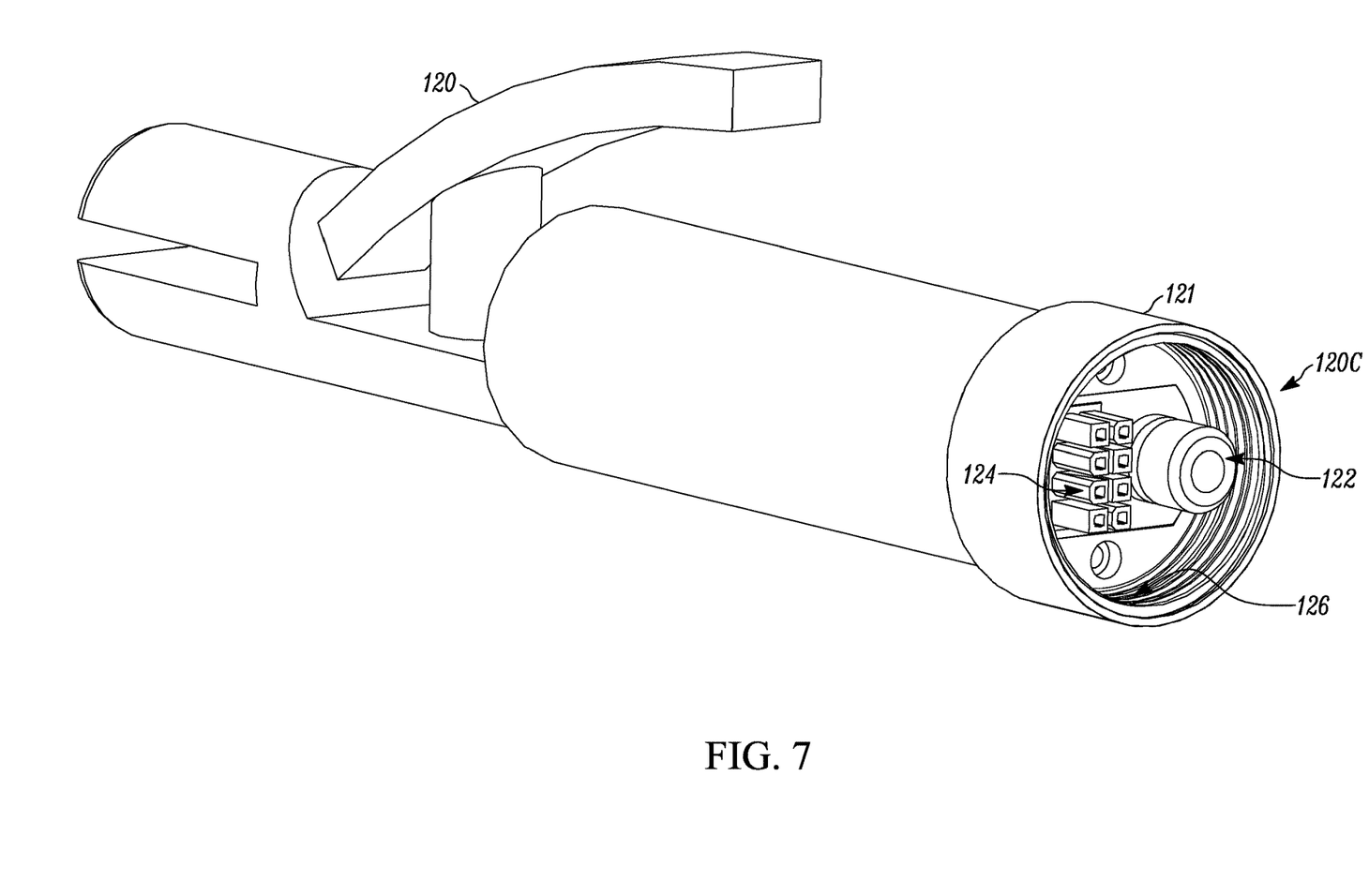
FIGS. 7-11 depict perspective views of example individual torch interfaces.
Figure 8:
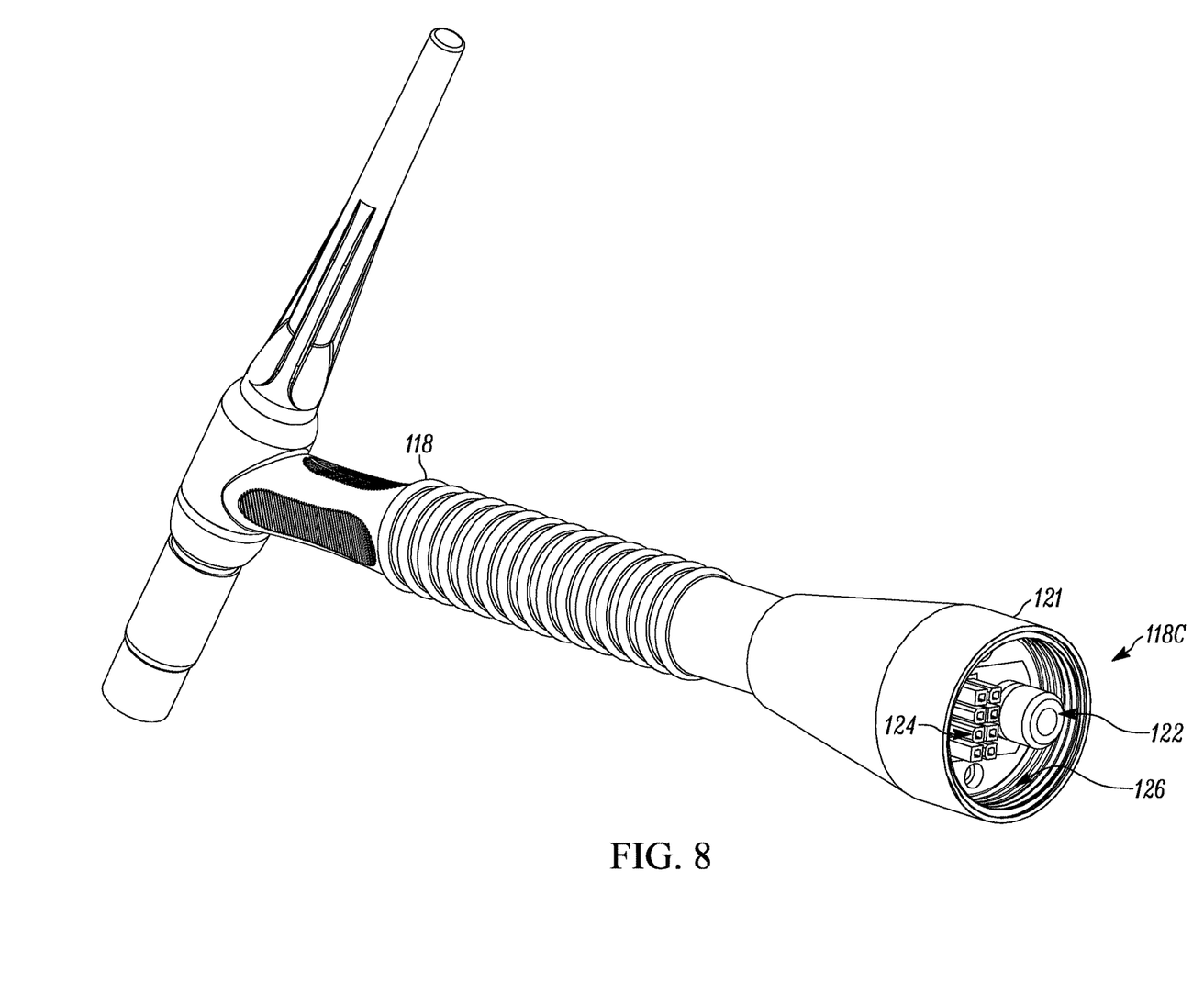
Figure 9:
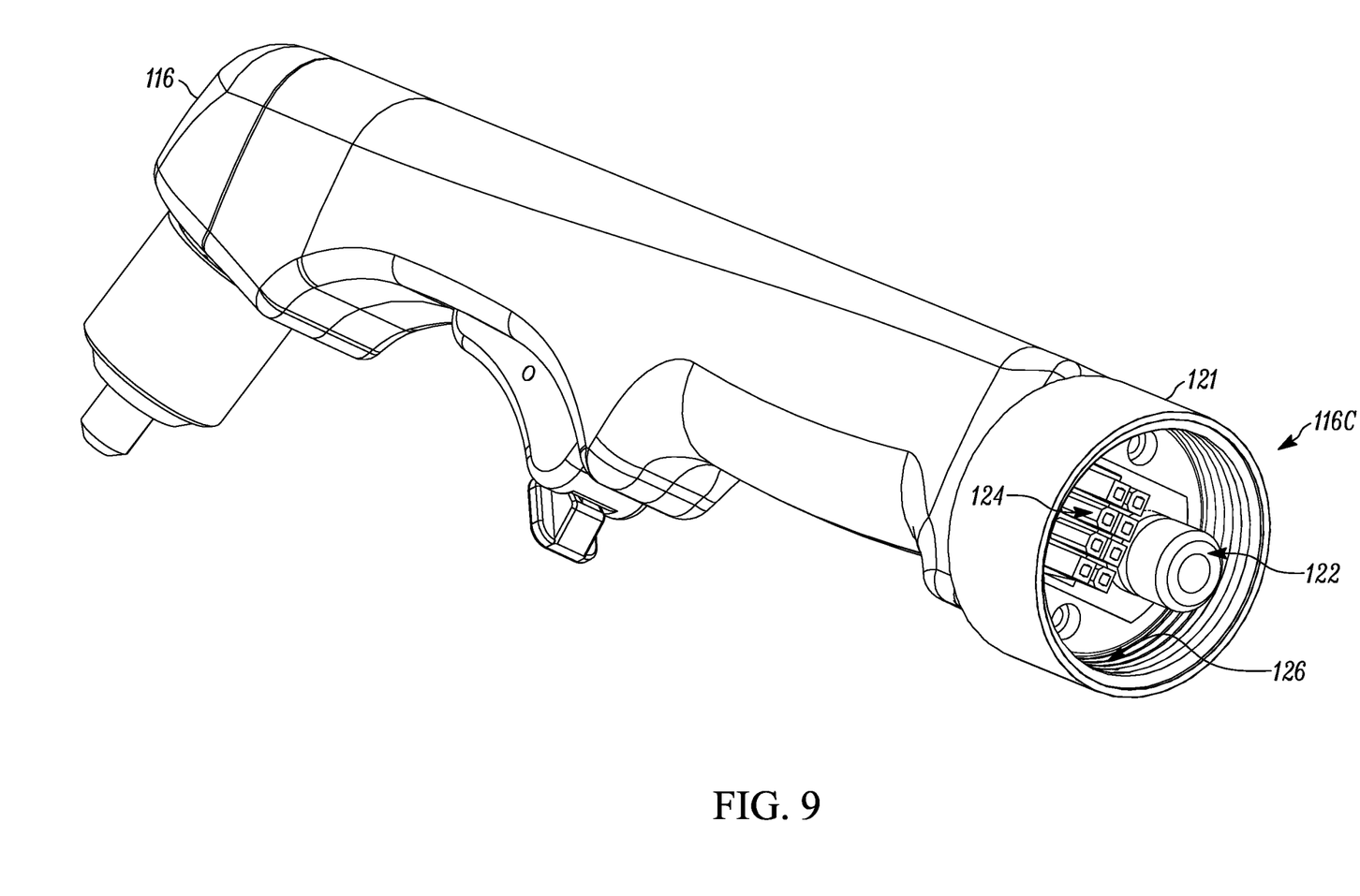
Figure 10:
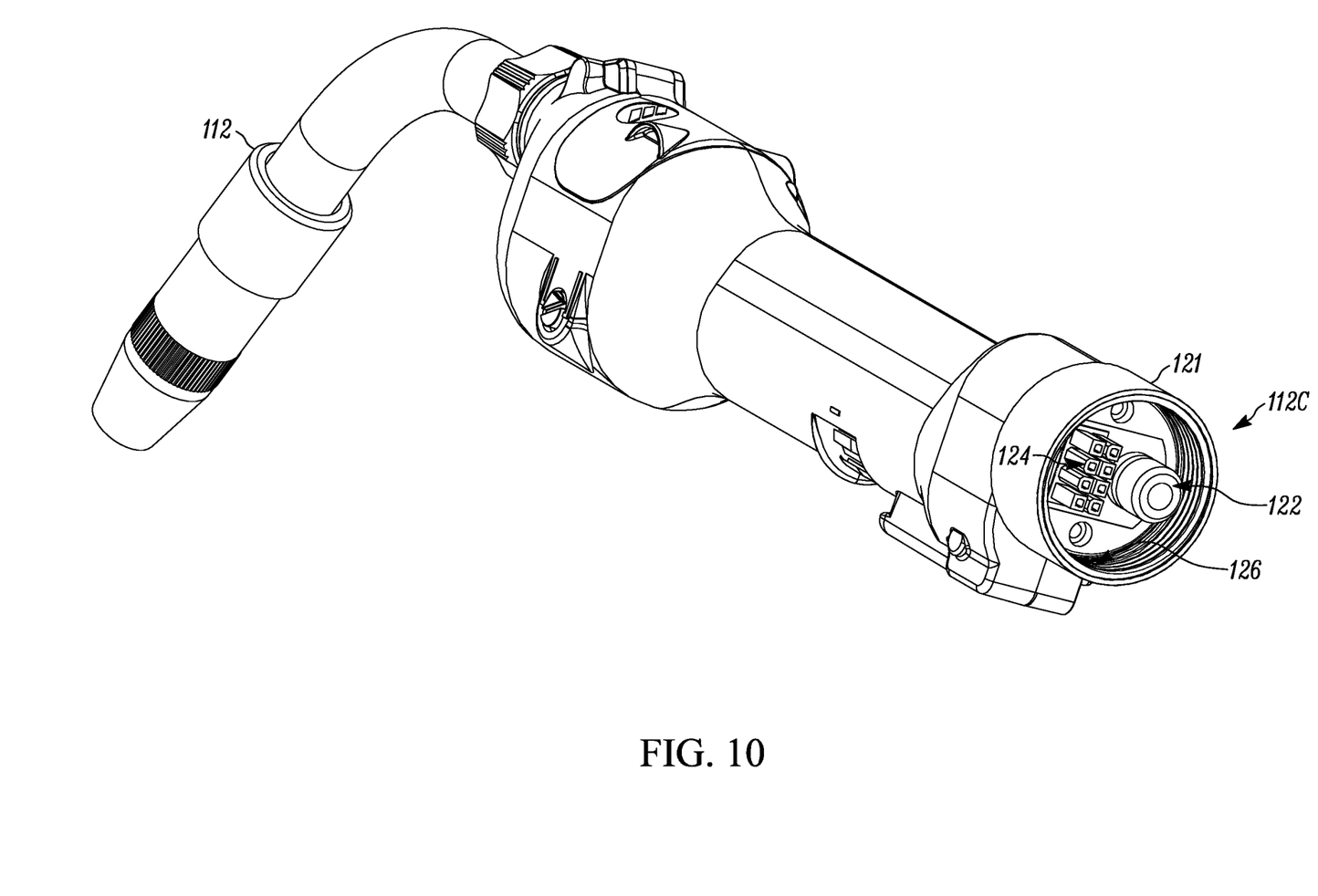
Figure 11:
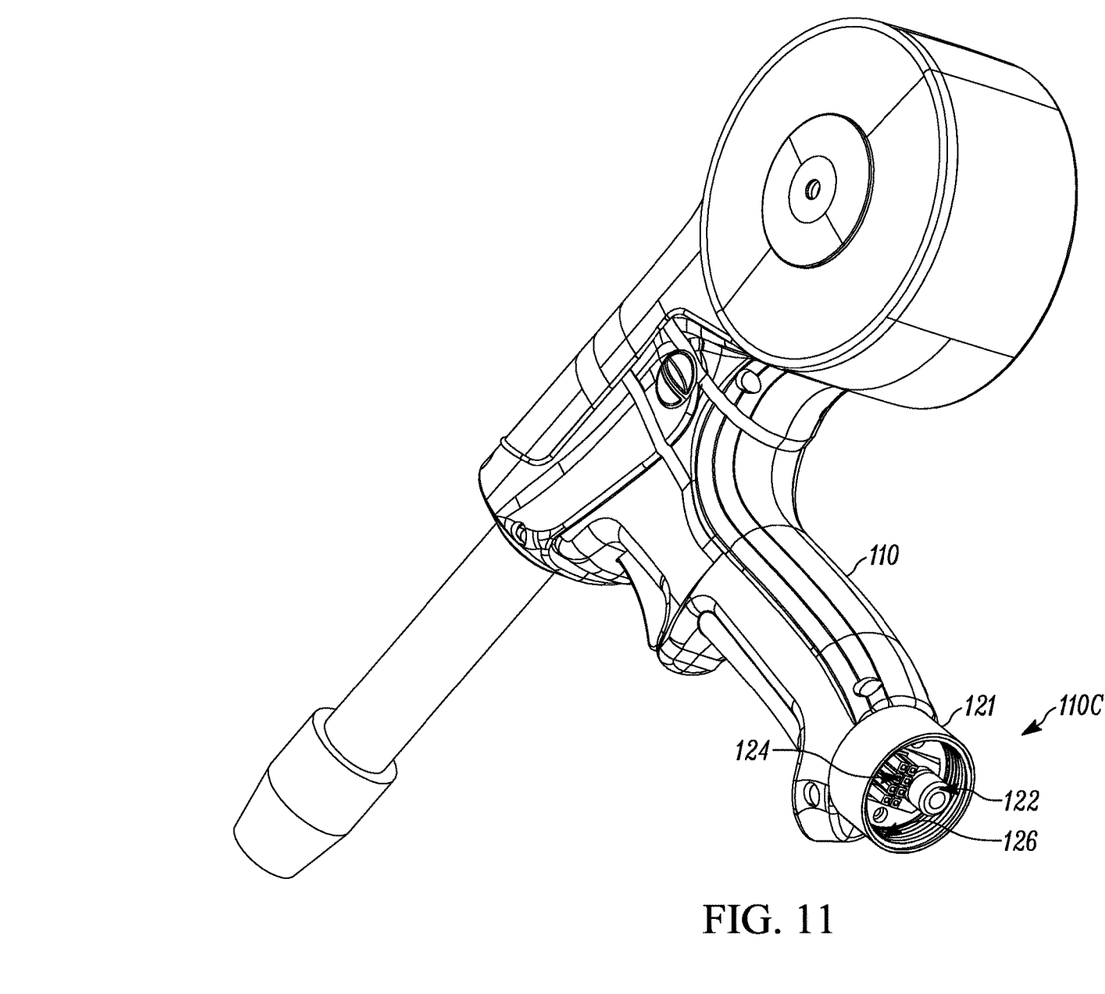

FIG. 6 illustrates example circuit diagrams 110D, 112D, 114D, 116D, 118D, 120D corresponding to a respective welding-type torches 110, 112, 114, 116, 118, 120 of FIG. 1. Each of the circuit diagrams 110D, 112D, 114D, 116D, 118D, 120D is connected to with respective ones of pins 1-8 of the connectors 108, 110C, 112C, 114C, 116C, 118C, 120C, as illustrated in FIG. 6. The data can generate information for the power supply, such as type of weld process or the identity of the welding-type torch connected to the multi-use cable assembly.

In the example of FIG. 6, each circuit includes a resistive element (e.g., R1 or R2) in communication with pin numbers 3 and 4. The resistance value provided between pins 3 and 4 in each of the connectors 110C, 112C, 114C, 116C, 118C, 120C enables a connected power supply to identify the welding-type torch in use and/or the particular welding process being used. Accordingly, in this example, the controller can recognize a particular welding-type torch and/or process without an input from the user. The ability to recognize a particular welding-type torch allows the controller to automatically make adjustments in a particular welding parameter (e.g., current, voltage, etc.). Additionally or alternatively, information can be controlled from one or more controls at the welding-type torch, such as amperage, as well as displayed at a remote display, for instance.

Different ones of the example welding-type torches 110, 112, 114, 116, 118, 120 include pins for trigger or pushbutton switches (e.g., pins 5 and 8 of the push-pull gun, the spool gun, the MIG torch, and/or the TIG torch), pins to provide power for a wire feed motor (e.g., pins 6 and 7 for the push-pull gun and/or the spool gun), and/or pins to detect an analog setting via a potentiometer resistance (e.g., pins 1, 2, and 3 for the push-pull gun, the spool gun, and/or the TIG torch). In this manner, the data connector is a multi-function data connector that can be used for any type of torch.

FIGS. 7-11 illustrate a perspective view of each of the welding-type torches 120, 118, 116 112, and 110, respectively. Each welding-type torch 120, 118, 116 112, and 110 includes a connector 120C, 118C, 116C 112C, and 110C, respectively. As shown in FIGS. 7-11, within each connector 120C, 118C, 116C 112C, and 110C is a power port 122 to provide at least one of welding-type power, gas, and wire to the welding-type torch 120, as well as one or more pins 124 to transmit and/or receive data and/or control signals between the welding-type torch and a computer, controller, power supply, display or other information source. Although reference numerals are used to designate features that may be similar in the welding-type torches 120, 118, 116 112, and 110, additional or alternative ports, inputs, and or connectors are possible. For example, the MIG welding-type torch 114 may employ a wire feed and therefore include a corresponding wire feed port, whereas the plasma torch 116 may not.

Accordingly, the present disclosure provides a system configured to quickly change the machine from one weld process and/or torch head to another without the need for additional cables. Beneficially, the manufacturing and operating costs are lower, as individual torches can share the multi-use cable, as opposed to maintaining a dedicated cable for each torch. Usefully, were a user to break a torch head, the time and cost of replacing the particular torch head is limited to the torch head itself, and not the entire cable.

The present invention has been described in the terms of the preferred embodiment and it is recognized that equivalents, alternatives, and modifications, aside from those expressly stated, are possible and within the scope of the disclosure.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present systems and apparatuses have been described with reference to certain implementations, it will be understood by those skilled in the art that various changes may be made and equivalents may be substituted without departing from the scope of the present systems and apparatuses. In addition, many modifications may be made to adapt a particular situation or material to the teachings of the present disclosure without departing from its scope. For example, block and/or components of disclosed examples may be combined, divided, re-arranged, and/or otherwise modified. Therefore, it is intended that the present systems and apparatuses not be limited to the particular implementations disclosed, but that the present systems and apparatuses will include all implementations falling within the scope of the appended claims.

What is claimed is:

1. A welding-type cable, comprising:
   a power conductor to conduct welding-type power; and
   a weld torch interface on a distal end of the welding-type cable to releasably attach a first weld torch type and a second weld torch type to the power conductor, wherein the weld torch interface comprises:
   a torch power connector to transfer the welding-type power between the power conductor and the weld torch;
   a torch data connector to transfer data between data conductors and the weld torch;
   a torch gas connector integral with the torch power connector to provide gas to the weld torch via a gas line; and
   a wire port integral with the torch power connector, the wire port configured to provide an electrode wire to the weld torch via a wire liner, wherein the power conductor, the data conductors, the gas line, and the wire liner are encased in a single sheathing of the welding-type cable, wherein the first weld torch type is configured to receive each of the torch power, torch data, torch gas and the electrode wire, and the second weld torch type is configured to receive only torch power, torch data, torch gas, or a combination thereof via the weld torch interface and the welding-type cable, wherein each of the first and second weld torch type is configured to automatically allow provision of the torch power, torch data, torch gas, or the electrode wire based on the torch data.

2. The welding-type cable as defined in claim 1, further comprising an input gas connector to receive gas from a gas supply, the weld torch interface further comprising a torch gas connector to provide the gas to the weld torch.

3. The welding-type cable as defined in claim 1, wherein the weld torch interface is configured to be detachably connected to a connector of the first weld torch type, the first weld torch type comprising any of a consumable-electrode-type weld torch, a non-consumable electrode-type weld torch, a spool gun-type weld torch, or a push-pull-type weld torch.

4. The welding-type cable as defined in claim 1, further comprising a power supply interface on a proximal end of the welding-type cable, the power supply interface comprising:
   a power supply power connector to transfer the welding-type power between a power supply and the power conductor; and
   a power supply data connector to transfer data between the power supply and data conductors.

5. The welding-type cable as defined in claim 4, wherein the power supply interface is configured to be connectable to standard power supply weld studs.

6. The welding-type cable as defined in claim 4, wherein the wire liner is configured to guide the wire electrode between the power supply interface and the weld torch interface.

7. The welding-type cable as defined in claim 1, further comprising a torch lock to detachably secure a connected weld torch to the weld torch interface.

8. The welding-type cable as defined in claim 1, wherein the weld torch is a manual weld torch or a robotically manipulated weld torch.

9. The welding-type cable as defined in claim 1, wherein the weld torch interface is configured to be detachably connected to a connector of the second weld torch type, the second weld torch type comprising a stick electrode holder or a plasma torch.

10. The welding-type cable as defined in claim 1, wherein the first weld torch type is a metal inert gas type torch configured to automatically allow provision of the torch power, torch data, torch gas, and the electrode wire.

11. The welding-type cable as defined in claim 1, wherein the second weld torch type is a plasma torch configured to automatically allow provision of the torch power, torch data, and torch gas and prevent provision of the electrode wire.

12. A welding-type torch, comprising:
   a connector comprising:
      a power connector to transfer welding-type power between the welding-type torch and a power conductor of a welding-type cable that is detachably coupled to the power connector;
      a data connector to transfer data between the welding-type torch and one or more data conductors of the welding-type cable that is detachably coupled to one or more data pins;
      a wire receptacle to transfer an electrode wire from the welding-type cable to the welding-type torch to perform a welding-type operation using the welding-type power; and
      a gas port integral with the connector to provide gas to the weld torch via a gas line; and
   a circuit configured to transmit, via the data connector, data identifying the welding-type torch as a first welding-type torch or first weld process or a second welding-type torch or second weld process, wherein the connector is configured to recieve each of the torch power, torch data, torch gas and the electrode wire when connected to the first welding-type torch, and receive only torch power, torch data, torch gas, or a combination thereof when connected to the second welding-type torch via the weld torch interface and the welding-type cable, wherein each of the first and second weld torch type is configured to connect to the wire port and automatically allow consumption of the received torch power, torch data, torch gas or the electrode wire.

13. The welding-type torch as defined in claim 12, wherein the welding-type torch is a consumable-electrode-type weld torch, a non-consumable electrode-type weld torch, a spool gun-type weld torch, a push-pull-type weld torch, a stick electrode holder, or a plasma torch.

14. The welding-type torch as defined in claim 12, wherein the one or more data pins to transfer data between torch circuitry and the one or more data conductors of the welding-type cable.

15. The welding-type torch as defined in claim 14, further comprising a torch identifier in communication with one or more electrical contacts of the data connector, the torch identifier to provide torch type information via the one or more electrical contacts in response to interrogation of the torch identifier.

16. The welding-type torch as defined in claim 15, wherein the torch identifier comprises a resistor having a resistance value corresponding to a torch type of the electrode.

17. The welding-type torch as defined in claim 12, further comprising a cable lock configured to detachably secure the welding-type torch to the welding-type cable.

18. The welding-type torch as defined in claim 12, wherein the welding-type torch is a manual welding torch or a robotically-controlled welding torch.

19. The welding-type torch as defined in claim 12, further comprising a torch cable of a predetermined length, a proximal end of the torch cable attached to the welding-type torch and the torch cable terminating at a distal end with the power connector and the data connector.

\* \* \* \* \*